United States Patent
Ho et al.

(10) Patent No.: US 7,216,183 B2
(45) Date of Patent: May 8, 2007

(54) METHOD FOR FACILITATING READ COMPLETION IN A COMPUTER SYSTEM SUPPORTING WRITE POSTING OPERATIONS

(75) Inventors: Kuan-Jui Ho, Taipei (TW); Jui-Ming Wei, Taipei (TW)

(73) Assignee: Via Technologies Inc., Taipei (TW)

( * ) Notice: Subject to any disclaimer, the term of this patent is extended or adjusted under 35 U.S.C. 154(b) by 518 days.

(21) Appl. No.: 10/885,436

(22) Filed: Jul. 6, 2004

(65) Prior Publication Data

US 2005/0172055 A1    Aug. 4, 2005

(30) Foreign Application Priority Data

Jan. 29, 2004    (TW) .............................. 93101948 A

(51) Int. Cl.
*G06F 13/14*    (2006.01)
*G06F 13/20*    (2006.01)

(52) U.S. Cl. .......................... 710/5; 710/306; 710/309; 710/311

(58) Field of Classification Search ..................... None
See application file for complete search history.

(56) References Cited

U.S. PATENT DOCUMENTS

| | | | |
|---|---|---|---|
| 5,938,739 A * | 8/1999 | Collins et al. .................. | 710/5 |
| 6,405,276 B1 * | 6/2002 | Chen et al. .................. | 710/310 |
| 6,721,813 B2 * | 4/2004 | Owen et al. .................... | 710/6 |
| 2002/0184453 A1 * | 12/2002 | Hughes et al. .............. | 711/150 |

* cited by examiner

*Primary Examiner*—Ilwoo Park
(74) *Attorney, Agent, or Firm*—Thomas, Kayden, Horstemeyer & Risley

(57) ABSTRACT

A method for facilitating read completion in a computer system supporting write posting operations. A posted memory write and its associated tag both need to be buffered, where the associated tag is designated to a master of a local bus originating the posted memory write. When a read request moving in an opposite direction of the posted memory write is detected, the read request is checked to identify which master of the local bus is addressed. A destination tag is then assigned to the read request contingent upon the currently addressed master. Further, the destination tag of the read request is compared with the associated tag of the posted memory write. If the destination tag of the read request differs from the associated tag of the posted memory write, the read request can be completed directly regardless of the outstanding posted writes.

14 Claims, 2 Drawing Sheets

METHOD FOR FACILITATING READ COMPLETION IN A COMPUTER SYSTEM SUPPORTING WRITE POSTING OPERATIONS

BACKGROUND

The invention relates to computer systems, and more particularly to integrated bus bridge designs for use in high performance computer systems.

Computer architectures generally include a number of devices interconnected by one ore more buses. For example, conventional computer systems typically include a CPU coupled through bridge logic to an external memory. A main memory controller is thus incorporated within the bridge logic to generate various control signals for accessing the main memory. An interface to a high bandwidth local expansion bus, such as the Peripheral Component Interconnect (PCI) bus, may be included as a portion of the bridge logic. Examples of devices which can be coupled to the local expansion bus comprise network interface cards, audio processors, IDE controllers, and so forth.

However, conventional bridge logic provides relatively poor performance with respect to main memory accesses by other devices residing on peripheral buses, and similarly provides relatively poor performance with respect to data transfers between the CPU and peripheral buses as well as between peripheral devices interconnected by the bridge logic. In recent years, computer systems have been increasingly utilized in the processing of various real time applications, including multimedia applications such as video and audio, telephony, and speech recognition. These systems require not only that the CPU have adequate access to the main memory, but also that devices residing on various peripheral buses such as the PCI bus have fair access to the main memory. Furthermore, it is often important that transactions between processor bus and peripheral buses should be efficiently handled. The bus bridge logic for a modern computer system must accordingly include mechanisms to efficiently prioritize and arbitrate among the varying requests of devices seeking access to main memory and to other system components coupled through the bridge logic.

To support high performance, many bus bridge designs support write posting operations for write transactions originating on one or more of the interfaced buses. Specifically, many bus bridge designs allow the bus bridge to receive and "post" a write transaction originating on the processor bus or the peripheral bus. When the write data is received by the bus bridge, the transaction on the processor or peripheral bus can be completed, even though the write data has not yet actually been written into main memory or to a destination bus by the bus bridge. Once a write has been posted in the bus bridge, the bridge may complete the write to the destination at a later time in an efficient manner without stalling the initial write transaction presented on the processor or peripheral bus.

While write posting in bus bridges greatly improves performance, problems relating to memory coherency can arise. To avoid coherency problems, various ordering rules may be established. The PCI Local Bus Specification specifies the ordering requirements for bus bridges. For example, one of the ordering requirements states that posted memory writes originating on the opposite side of the bridge from a read transaction and completing on the read-destination bus before the read command completes on the read-transaction bus must complete on the read-origin bus in the same order. In other words, before the read transaction can complete on its originating bus, it must pull out of the bridge any posted writes that originated on the opposite side and were posted before the read command completes on the read-destination bus. Yet the ordering requirements are so strict that it discourages further improvement in system performance. In practice, the read completion can be expedited on condition that the read command is not destined to the same master originating the posted memory write. Only if the read destination and the originating master are the same device must the above ordering rule be enforced. Therefore, it is desirable to provide a mechanism within a bus bridge to facilitate read completion even though there are outstanding write requests.

SUMMARY

The present invention is generally directed to a method for facilitating read completion in a computer system supporting write posting operations. According to one aspect of the invention, the computer system includes a bus bridge and one or more bus masters on one side of the bus bridge. To begin with, the bus masters are associated with respective tags. Posted memory writes are buffered together with their tags that are associated with those bus masters originating the posted memory writes. Once a read request originating on the opposite side of the bus bridge is detected, the read request is checked to identify which bus master it is addressed to. A destination tag is then assigned to the read request contingent upon the currently addressed bus master. Further, the destination tag of the read request is compared with the associated tags of the posted memory writes being buffered. The read request can be completed directly if the destination tag of the read request does not match any of the associated tags of the posted memory writes being buffered. Otherwise, the read request must be suspended until the posted memory writes are flushed.

According to another aspect of the invention, one or is more masters of a local bus are first associated with respective tags. Furthermore, a posted memory write and an associated tag are both buffered, where the tag is associated with one of the masters originating the posted memory write. Upon detection of a read request moving in an opposite direction of the posted memory write, the read request is checked to identify which master of the local bus it is addressed to. A destination tag is then assigned to the read request contingent upon the currently addressed master. Additionally, the destination tag of the read request is compared with the associated tag of the posted memory write. If the destination tag of the read request differs from the associated tag of the posted memory write, the read request can be completed directly, thereby resulting in significantly higher system performance. Otherwise, the read request must be suspended until the relative posted memory writes being buffered are flushed.

According to yet another aspect of the invention, a posted memory write and its associated tag must both be buffered. Note that the associated tag is designated to a master of a local bus originating the posted memory write. When a read request moving in an opposite direction of the posted memory write is detected, the read request is checked to identify which master of the local bus it is addressed to. A destination tag is then assigned to the read request contingent upon the currently addressed master. Further, the destination tag of the read request is compared with the associated tag of the posted memory write. If the destination tag of the read request differs from the associated tag of the posted memory write, the read request can be completed directly to improve system performance.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

With reference to the accompanying figures, exemplary embodiments of the invention will now be described. The exemplary embodiments are described primarily with reference to block diagrams and flowcharts. As to the flowcharts, each block within the flowcharts represents both a method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
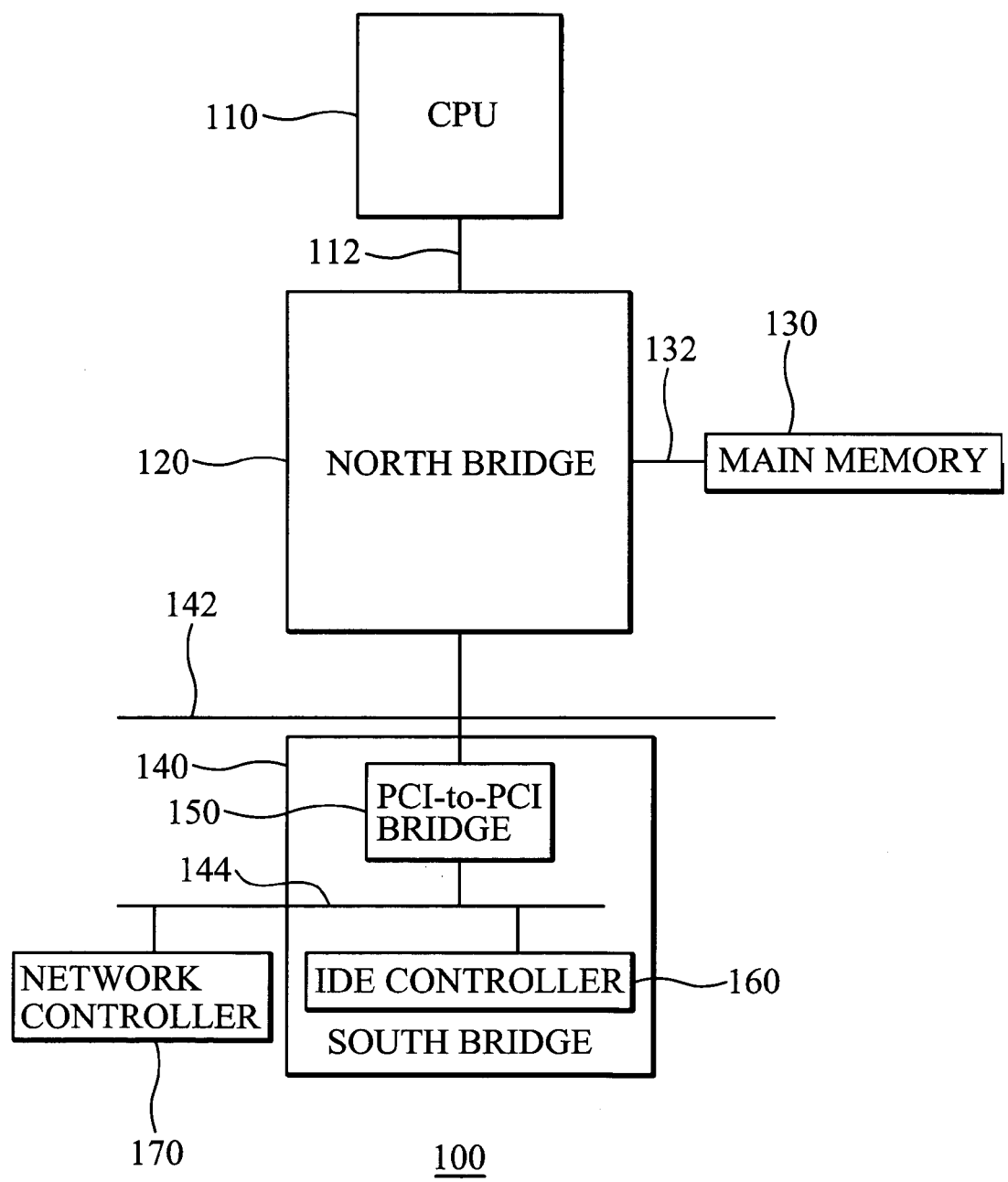
FIG. 1 is a block diagram of an exemplary computer system useful in understanding the invention.

With reference to FIG. 1, an exemplary computer system 100 is shown including a chipset containing two main components—the North Bridge 120 and the South Bridge 140. The term "Bridge" comes from a reference to a device that connects multiple buses together. The North Bridge 120 acts as the connection point for a CPU 110, a main memory 130, a graphics controller (not shown) and the South Bridge 140; it connects a front side bus (FSB) or processor bus 112 to a memory bus 132, an AGP graphics bus (not shown), and a peripheral bus 142. The South Bridge 140, in its simplest form, integrates various I/O controllers, provides interfaces to peripheral devices and buses, and transfers data to/from the North Bridge 120 through either a proprietary interconnection or a PCI bus connection identified by reference numeral 142 in FIG. 1. For example, the South Bridge 140 may incorporate some peripherals like IDE, USB, ISA, and so forth. In one embodiment, a PCI-to-PCI bridge 150 is integrated into the South Bridge 140 to overcome electrical loading limits and increase data throughput. The PCI-to-PCI bridge usually has two PCI interfaces, the primary and secondary. By definition, the PCI interface of the bridge that is connected to the PCI bus closest to the CPU is referred to as the primary PCI interface. The PCI interface of the bridge that is connected to the PCI bus farthest from the CPU is referred to as the secondary PCI interface. In the example of FIG. 1, the primary interface of bridge 150 is connected to a PCI bus 142 while its secondary interface is connected to a PCI bus 144. The South Bridge 140 also integrates an IDE controller 160 residing on the secondary PCI bus 144 for the purpose of explanation. Additionally, a network controller 170 external to the South Bridge 140 is coupled to the secondary PCI bus 144 as well. The PCI-to-PCI bridge 150 is able to store posted memory write data in a posting buffer (not shown) and to assume responsibility for ensuring that the posted transaction completes at the final destination. Note that the devices capable of initiating a bus transaction are said to be bus masters. The South Bridge 140 and the PCI-to-PCI bridge 150 are together hereinafter referred to as a bus bridge 140 for brevity. The present invention, however, is not limited to any particular type of computer system.

Figure 2:
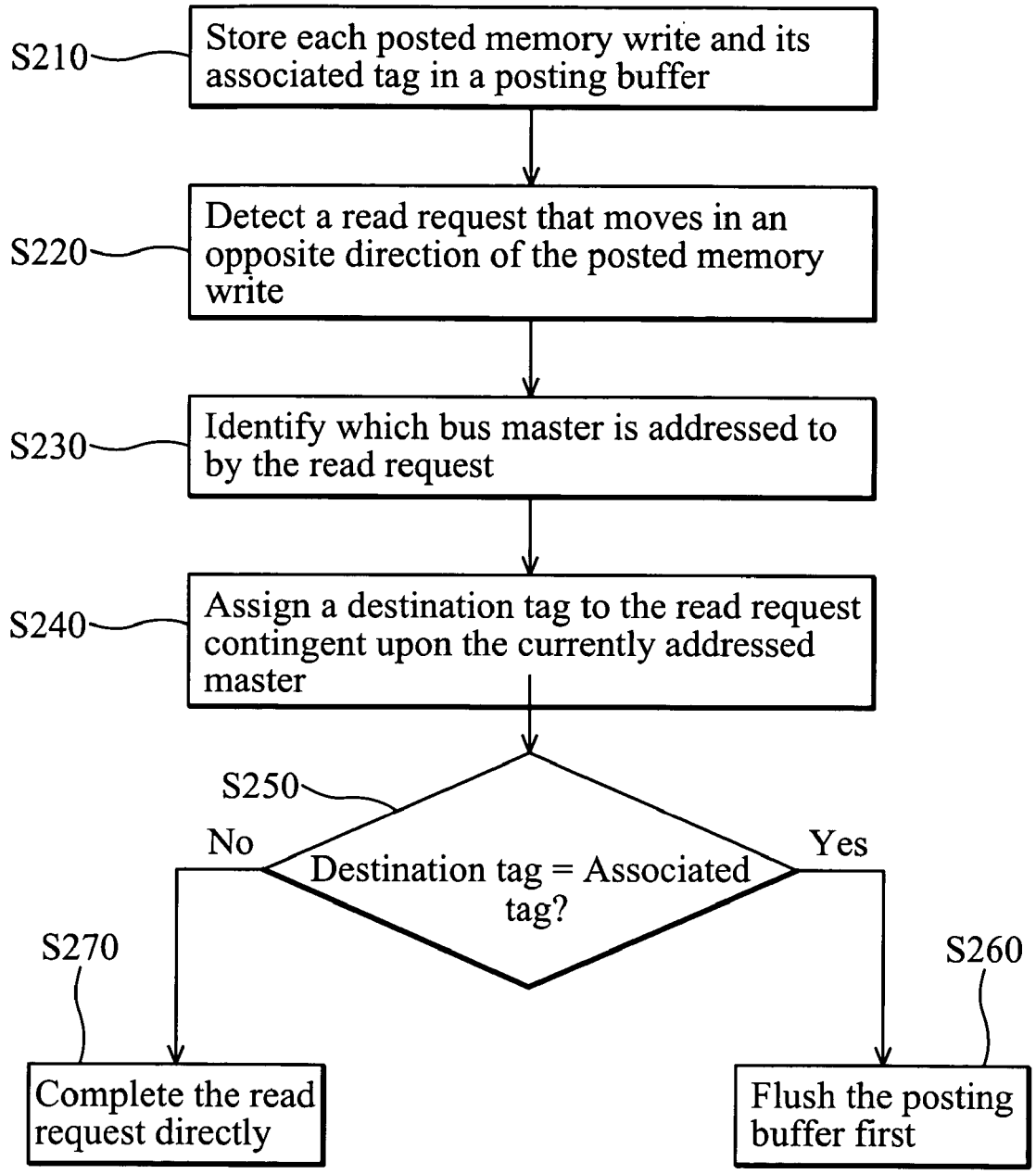
FIG. 2 is a flowchart illustrating primary steps executed by a bus bridge in accordance with an embodiment of the invention.

The invention will now be described in detail by reference to FIG. 2 when taken in conjunction with FIG.1. To begin with, the bus bridge 140 associates each bus muster on the PCI buses 142 and 144 with an individual tag. As to the secondary PCI bus 144, the external network controller 170 is associated with a tag of '00' and the internal IDE controller 160 is associated with a tag of '01'. As to the primary PCI bus 142, the CPU 110 and the North Bridge 120 are viewed as a whole so they are together associated with a tag of '10'. FIG. 2 illustrates a flowchart of primary steps executed by the bus bridge 140. In step S210, each posted memory write together with a tag are stored in the posting buffer, wherein this tag is associated with the bus master originating the posted memory write. For example, is the IDE controller 160 attempts to post a memory write transaction. Hence, the bus bridge 140 stores the posted write data and an associated tag of '01' in the posting buffer. In this example, the memory write data is addressed to the main memory 130. Before the posted transaction reaches its ultimate destination (main memory 130), the IDE controller 160 often asserts an interrupt request and then proceeds with other work. In response to the interrupt request, the CPU 110 executes an interrupt service routine to perform a read to any register in the IDE controller 160 for guaranteeing consistency of data. Therefore, a read request aimed at the IDE controller 160 is initiated and appears as a transaction on the primary PCI bus 142. In step S220, when the bus bridge 140 detects the read request moving in an opposite direction of the posted memory write, it proceeds to step S230 where the read request is checked to identify which bus master it is addressed to. In this regard, the read request is checked for each bus master to see which address range covers a destination address of the read request. Because the read request is destined to the IDE controller 160 in this scenario, the destination address of the read request falls into the address range of the IDE controller 160. The bus bridge 140 then encodes a destination tag for the read request, in which the destination tag is a value of '01' to represent the IDE controller 160. As such, a destination tag is assigned to the read request contingent upon the currently addressed bus master in step S240.

The bus bridge 240 next proceeds to step S250 where the destination tag of the read request is compared with the associated tag of the posted memory write being buffered. The destination tag will match the associated tag, provided that the memory write initiated by the IDE controller 160 is still posted in the bus bridge 140. If so, in step S260, the posting buffer must be flushed before the read can be completed to meet the PCI ordering requirements. On the other hand, the bus bridge 140 allows for some transactions following the posted memory write of the IDE controller 160 to be posted. Assuming that these transactions are initiated from the network controller 170, the bus bridge 140 also stores the tag '00' in the posting buffer for them. Before detecting the above read request addressed to the IDE controller 160, however, the bus bridge 140 has completed the posted write at the main memory 130 for the IDE controller 160. Upon receipt of the read request, in this case, the bus bridge 140 now contains the posted memory write initiated from the network controller 170. Thus, the destination tag of '01' carried by the read request does not match any the associated tags in the posting buffer. In accordance with the invention, the bus bridge 140 proceeds to step S270 where the read request is completed directly regardless of the outstanding write transactions, thereby resulting in significantly higher system performance. Although the invention is described by way of posted memory writes originating on the secondary PCI bus, it should be understood that the invention is also applicable to those originating on the primary PCI bus.

Accordingly, the present invention provides a method for facilitating read completion in a computer system supporting write posting operations. In brief, one or more bus masters are first associated with respective tags. When this occurs, posted memory writes are buffered together with their tags that are associated with those bus masters originating the posted memory writes. Once a read request originating on the opposite side of the bus bridge is detected, the read request is checked to identify which bus master it is addressed to. A destination tag is then assigned to the read request contingent upon the currently addressed bus master. Further, the destination tag of the read request is compared with the associated tags of the posted memory writes being buffered. The read request can be completed directly if the destination tag of the read request does not match any of the associated tags of the posted memory writes being buffered. Otherwise, the read request must be suspended until the posted memory writes are flushed. The present invention thus improves the overall system performance dramatically by facilitating read completion.

While the invention has been described by way of examples and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for facilitating read completion in a computer system supporting write posting operations, comprising the steps of:
   associating one or more bus masters with respective tags, wherein the bus masters reside on one side of a bus bridge;
   buffering posted memory writes and the tags associated with the corresponding bus masters that originate the posted memory writes;
   detecting a read request that originates on the opposite side of the bus bridge;
   identifying which bus master is addressed by the read request;
   assigning a destination tag to the read request contingent upon the currently addressed bus master;
   comparing the destination tag of the read request with the associated tags of the posted memory writes being buffered;
   if the destination tag of the read request does not match any associated tags of the posted memory writes being buffered, completing the read request directly; and
   if the destination tag of the read request matches at least one of the associated tags of the posted memory writes being buffered, suspending the read request until the posted memory writes are flushed.

2. The method as recited in claim 1 wherein the identifying step comprises checking the read request for each bus master to see whose address range covers a destination address of the read request.

3. The method as recited in claim 2 wherein the assigning step comprises encoding the destination tag for the read request, wherein the destination tag is a value on behalf of the currently addressed master whose address range covers the destination address of the read request.

4. The method as recited in claim 1 wherein the bus bridge is compliant with PCI Local Bus Specification.

5. The method as recited in claim 4 wherein the bus bridge is a PCI-to-PCI bridge integrated in a South Bridge chip.

6. A method for facilitating read completion in a computer system supporting write posting operations, comprising the steps of:
   associating one or more masters of a local bus with respective tags;
   buffering a posted memory write and an associated tag thereof, where the tag is associated with one of the masters originating the posted memory write;
   detecting a read request that moves in an opposite direction of the posted memory write;
   identifying which master of the local bus is addressed by the read request;
   assigning a destination tag to the read request contingent upon the currently addressed master;
   comparing the destination tag of the read request with the associated tag of the posted memory write;
   if the destination tag of the read request differs from the associated tag of the posted memory write, completing the read request directly; and
   if the destination tag of the read request matches the associated tag of the posted memory write, suspending the read request until the posted memory write being buffered is flushed.

7. The method as recited in claim 6 wherein the identifying step comprises checking the read request for each master to see which address range covers a destination address of the read request.

8. The method as recited in claim 7 wherein the assigning step comprises encoding the destination tag for the read request, wherein the destination tag is a value on behalf of the currently addressed master whose address range covers the destination address of the read request.

9. The method as recited in claim 6 wherein the local bus is compliant with PCI Local Bus Specification.

10. A method for facilitating read completion in a computer system supporting write posting operations, comprising the steps of:
    buffering a posted memory write and an associated tag thereof, where the associated tag is designated to a master of a local bus originating the posted memory write;
    detecting a read request that moves in an opposite direction of the posted memory write;
    identifying which master of the local bus is addressed by the read request;
    assigning a destination tag to the read request contingent upon the currently addressed master;
    comparing the destination tag of the read request with the associated tag of the posted memory write; and
    if the destination tag of the read request differs from the associated tag of the posted memory write, completing the read request directly.

11. The method as recited in claim 10 further comprising the step of:
   if the destination tag of the read request matches the associated tag of the posted memory write, suspending the read request until the posted memory write being buffered is flushed.

12. The method as recited in claim 10 wherein the identifying step comprises checking to see whether an address range of the master covers a destination address of the read request.

13. The method as recited in claim 12 wherein the assigning step comprises encoding the destination tag for the read request, wherein the destination tag is a value on behalf of the currently addressed master whose address range covers the destination address of the read request.

14. The method as recited in claim 10 wherein the local bus is compliant with PCI Local Bus Specification.

* * * * *